(12) United States Patent
Jansson et al.

(10) Patent No.: US 11,196,463 B2
(45) Date of Patent: Dec. 7, 2021

(54) METHOD AND APPARATUS FOR BEAMFORMING CONTROL IN A WIRELESS COMMUNICATION NETWORK

(71) Applicant: Telefonaktiebolaget LM Ericsson (publ), Stockholm (SE)

(72) Inventors: Jens Jansson, Lund (SE); Peter Alriksson, Hörby (SE); Jagadeesh Arunachalam, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/255,744

(22) PCT Filed: Jun. 27, 2018

(86) PCT No.: PCT/EP2018/067267
§ 371 (c)(1),
(2) Date: Dec. 23, 2020

(87) PCT Pub. No.: WO2020/001761
PCT Pub. Date: Jan. 2, 2020

(65) Prior Publication Data
US 2021/0273686 A1    Sep. 2, 2021

(51) Int. Cl.
*H04B 7/0408* (2017.01)
*H04B 7/06* (2006.01)
(Continued)

(52) U.S. Cl.
CPC .......... *H04B 7/0408* (2013.01); *G01S 13/426* (2013.01); *G01S 17/42* (2013.01);
(Continued)

(58) Field of Classification Search
CPC .................................................. H04B 7/0408
See application file for complete search history.

(56) References Cited

U.S. PATENT DOCUMENTS

2007/0037528 A1    2/2007  Doan et al.
2012/0062743 A1*   3/2012  Lynam .............. B60W 50/0098
                                                            348/148
(Continued)

FOREIGN PATENT DOCUMENTS

CN        101867401 A    10/2010
WO        2017108688 A1   6/2017

OTHER PUBLICATIONS

U.S. Appl. No. 62/576,491, filed Oct. 2017, Vasanthan Raghavan.*
(Continued)

*Primary Examiner* — Hsinchun Liao
(74) *Attorney, Agent, or Firm* — Murphy, Bilak & Homiller, PLLC

(57) ABSTRACT

A wireless communication apparatus (10) uses a RADAR or LIDAR assembly to scan for obstructions in predefined beam directions relative to a directional antenna (40) and correspondingly classifies each direction as obstructed or unobstructed. Then, at least for communication signal frequencies above a defined frequency threshold, the apparatus (10) configures beamforming at the directional antenna (40) to prioritize beams corresponding to the unobstructed directions, or avoid beams corresponding to the obstructed directions. The beam prioritization or avoidance applies to transmit beamforming, receive beamforming, or both. In one or more implementations, the direction classifications may not be binary. For example, detected obstruction distances along the beam directions may be used to "grade" the respective directions in terms of usage priority, beam adaptations, and/or restrictions on the communication frequencies used.

20 Claims, 8 Drawing Sheets

(51) Int. Cl.
  H04B 7/10    (2017.01)
  G01S 17/42   (2006.01)
  H04W 52/18   (2009.01)
  G01S 13/42   (2006.01)
  H04B 7/26    (2006.01)

(52) U.S. Cl.
  CPC ............. *H04B 7/0695* (2013.01); *H04B 7/10* (2013.01); *H04B 7/2606* (2013.01); *H04W 52/18* (2013.01)

(56) References Cited

U.S. PATENT DOCUMENTS

| | | | |
|---|---|---|---|
| 2015/0195026 A1 | 7/2015 | Sagong et al. | |
| 2016/0087335 A1* | 3/2016 | Marr | H01Q 3/00 342/368 |
| 2016/0278065 A1 | 9/2016 | Kim et al. | |
| 2017/0045623 A1* | 2/2017 | Zlogar | G01S 3/14 |
| 2018/0316481 A1* | 11/2018 | Montojo | H04L 5/003 |

OTHER PUBLICATIONS

3GPP, "Study on LTE Based V2X Services", 3GPP TR 36.885 V14.0.0, Jun. 2016, 216 pages.

Capone, Antonio, "Obstacle Avoidance Cell Discovery using mm-waves Directive Antennas in 5G Networks", DEIB—Politecnico di Milano, IMDEA Networks Institute, Universidad Carlos III de Madrid, 2015, 5 pages.

Davies, Alex, "Turns out the Hardware in Self-Driving Cars is Pretty Cheap", https://www.wired.com/2015/04/cost-of-sensors-autonomous-cars/, Apr. 22, 2015, pp. 1-10.

Ericsson, "Carrier & Spectrum Sharing", Ericsson, With acknowledgements to Sibel T. & Gösta L., Oct. 16, 2017, pp. 1-21.

González-Prelcic, Nuria, et al., "Millimeter Wave communication with out-of-band information", IEEE Communications Magazine, vol. 55, Issue 12, Dec. 2017, pp. 1-14.

González-Prelcic, Nuria, et al., "Radar Aided Beam Alignment in MmWave V2I Communications Supporting Antenna Diversity", IEEE 2016 Information Theory and Applications Workshop (ITA), La Jolla, CA, USA, Jan. 31-Feb. 5, 2016, pp. 1-7.

Maschietti, Flavio, et al., "Robust Location-Aided Beam Alignment in Millimeter Wave Massive MIMO", IEEE 2017 IEEE Global Communications Conference (GLOBECOM 2017), Singapore, Dec. 4-8, 2017, pp. 1-24.

McCormick, Patrick M., et al., "Simultaneous Radar and Communications Emissions from a Common Aperture, Part I: Theory", 2017 IEEE Radar Conference, Conference Paper, 2017, pp. 1-6.

Project Soli, "Your hands are the only interface you'll need", https://atap.google.com/soli/, accessed Apr. 27, 2018, pp. 1-11.

* cited by examiner

METHOD AND APPARATUS FOR BEAMFORMING CONTROL IN A WIRELESS COMMUNICATION NETWORK

TECHNICAL FIELD

The present invention relates to beamforming control in a wireless communication network and specifically relates to the use of RADAR or LIDAR scanning as an input to beamforming control.

BACKGROUND

Current activities of the Third Generation Partnership Project (3GPP) include standardization of the fifth generation (5G) cellular systems, including the so-called New Radio (NR) interface contemplated for use in 5G networks. A key aim of NR is the flexibility to support multiple and substantially different use cases. Besides the typical mobile broadband use case, NR makes provisions for machine type communication (MTC), ultra-low latency critical communications (ULLCC), side-link device-to-device (D2D), vehicle-to-vehicle (V2V), and vehicle-to-everything (V2X), among other use cases.

One of the key features of NR is that mechanisms for advanced antenna systems are built into the standard from the start. These advanced antenna systems involve transmit and/or receive beamforming. In transmit beamforming, the transmitter directs its transmitted energy towards an intended receiver and/or away from an unintended receiver. More generally, transmit beamforming involves shaping or concentrating the transmitted signal energy in one or more beams, generally with the different beams corresponding to different directions. With receiver beamforming, the involved receiver configures its antenna system to only receive in certain directions or, more generally, to increase its receive antenna gain in a directional sense, so that the receiver can be understood as being tuned or otherwise configured to receive in one or more specific directions.

Determining the signal weightings for the respective antennas or antenna elements being used for beamforming often involves two steps. In a first step of transmit beamforming, a transmitter sequentially transmits beams in respective directions—possibly with overlapping coverage. The corresponding second step involves one or more receivers returning feedback to the transmitter. For example, the feedback indicates which beams were received, or provides indications of measured signal quality for one or more beams, either of which allows the transmitter to determine which beam(s) are best used for serving the reporting receivers. Receive beamforming may involve a similar two-step operation, where a beamforming receiver evaluates multiple reception directions and provides a corresponding reception quality report to the involved transmitter.

Other aspects of NR and, in general, developing wireless communication networks, introduce significant complications. Increasing communication signal frequencies stands as one of the chief complications. While higher signal frequencies offer the possibility of higher data rates, higher-frequency signals suffer significant propagation problems. For example, a communication signal carrier at 600 MHz offers relative robust penetration of buildings and offers good multipath performance, meaning that Line-of-Sight (LoS) coverage conditions are not required for good communication signal quality. Conversely, communication signal carriers at 2 GHz, 6 GHz, or even higher frequencies, suffer from decreased structure penetration and, in general, increasing sensitivity to obstructions along the LoS to the targeted receiver. NR contemplates much higher carrier frequencies than seen in previous generation wireless networks, such as 30 GHz and beyond. Carriers at such frequencies are quite sensitive to obstructions.

SUMMARY

A wireless communication apparatus uses a RADAR or LIDAR assembly to scan for obstructions in predefined beam directions relative to a directional antenna and correspondingly classifies each direction as obstructed or unobstructed. Then, at least for communication signal frequencies above a defined frequency threshold, the apparatus configures beamforming at the directional antenna to prioritize beams corresponding to the unobstructed directions, or avoid beams corresponding to the obstructed directions. The beam prioritization or avoidance applies to transmit beamforming, receive beamforming, or both. In one or more implementations, the direction classifications may not be binary. For example, detected obstruction distances along the beam directions may be used to "grade" the respective directions in terms of usage priority, beam adaptations, and/or restrictions on the communication frequencies used.

One embodiment involves a method of operation by a wireless communication apparatus, which may be, for example, a base station or other radio network node or controller in the Radio Access Network (RAN) portion of a wireless communication network. According to an example implementation of the contemplated method, the apparatus scans in directions corresponding to a predefined set of beams associated with a directional antenna of the apparatus, using RADAR or LIDAR scanning. The apparatus classifies each direction as obstructed or unobstructed, based on results from the scanning and configures beamforming at the directional antenna to prioritize the use of beams in the predefined set that correspond to unobstructed directions or avoid using beams in the predefined set that correspond to obstructed directions. The configuring operations are done at least with respect to communication signal frequencies above a defined frequency threshold.

An example wireless communication apparatus comprises interface circuitry configured to couple processing circuitry of the apparatus to a RADAR or LIDAR assembly. The processing circuitry is configured to scan, via the RADAR or LIDAR assembly, in directions corresponding to a predefined set of beams associated with a directional antenna of the apparatus. The processing circuitry is further configured to classify each direction as obstructed or unobstructed, based on results from the scan, and configure beamforming at the antenna to prioritize the use of beams in the predefined set that correspond to unobstructed directions or avoid using beams in the predefined set that correspond to obstructed directions. The configuring may be done for all communication signal frequencies in use at the apparatus or may be done at least for communication signal frequencies above a defined frequency threshold.

In another example embodiment, a wireless communication apparatus comprises an interface module or unit that is configured to couple one or more processing modules of the apparatus to a RADAR or LIDAR assembly, e.g., for controlling the assembly or at least for receiving RADAR or LIDAR scanning data from the assembly for directions corresponding to a predefined set of beams associated with a directional antenna of the apparatus. The apparatus further includes a scanning module configured to scan, via the RADAR or LIDAR assembly, in directions corresponding to the predefined set of beams associated with the directional antenna. Still further, the apparatus includes a classifying module that is configured to classify each direction as obstructed or unobstructed, based on results from the scan, and a configuring module that is configured to configure beamforming at the antenna to prioritize the use of beams in the predefined set that correspond to unobstructed directions or avoid using beams in the predefined set that correspond to obstructed directions. The configuring may be done for all communication signal frequencies in use at the apparatus or may be done at least for communication signal frequencies above a defined frequency threshold.

In yet another example embodiment, a non-transitory computer-readable medium stores computer program instructions that, when executed by one or more processing circuits of a wireless communication apparatus, cause the wireless communication apparatus to carry out a number of operations. Such operations include scanning, via an included or associated RADAR or LIDAR assembly, in directions corresponding to a predefined set of beams associated with a directional antenna. The operations further include classifying each direction as obstructed or unobstructed, based on results from the scan, and configuring beamforming at the antenna to prioritize the use of beams in the predefined set that correspond to unobstructed directions or avoid using beams in the predefined set that correspond to obstructed directions. The configuring may be done for all communication signal frequencies in use at the apparatus or may be done at least for communication signal frequencies above a defined frequency threshold.

In a further embodiment, a wireless communication apparatus comprises interface circuitry configured to couple processing circuitry of the apparatus to a RADAR or LIDAR assembly. The processing circuitry is configured to scan, via the RADAR or LIDAR assembly, in beamforming directions associated with a directional antenna of the apparatus. The processing circuitry is further configured to adapt its transmit signal power in respective beamforming directions in dependence on whether or at what distance obstructions were detected in the respective beamforming directions via the RADAR or LIDAR scanning Such adaptations effectively amount to the adaptation or shaping of the radio service coverage area provided by the apparatus, in dependence on its detection of surrounding obstacles via RADAR or LIDAR scanning. In at least one implementation, the apparatus uses the scan results for each beam direction to "grade" the direction. For example, the apparatus may judge how "good" a beam direction is in dependence on the distance(s) at which obstacles are detected in that direction. The grading of each beam direction may be quantized, e.g., with each quantization range corresponding to a range of distances, and other metrics, such as obstacle size, may be use instead of or in combination with distance to determine how "good" a beam direction is in an absolute sense or relative to the other beam directions.

In a related example embodiment, a method of operation at a wireless communication apparatus includes scanning in beamforming directions associated with a directional antenna and adapting the transmission power used for transmitting from the antenna in the respective beamforming directions in dependence on whether or at what distances obstructions were detected in the respective beamforming directions via the RADAR or LIDAR scanning Such adaptations effectively amount to adapting or shaping the radio service coverage area provided by the apparatus, in dependence on its detection of surrounding obstacles via RADAR or LIDAR scanning.

The apparatus may perform and apply the adaptation operations for all communication signal frequencies or may restrict the adaptations to the transmission of communication signals that are above a defined frequency threshold. As such, one or more example implementations involve a wireless communication apparatus that is configured to operate with differently shaped coverage areas—e.g., different coverage boundary contours or extents—for different carrier frequencies. In one example, for a first communication signal frequency or range of frequencies, the apparatus does not shape its coverage in dependence on obstacles detected along the LoS of its directional beams, whereas it does perform shaping for a second communication signal frequency or range of frequencies. The frequency threshold may be, for example, 2 GHz, or 6 GHz. Similarly, the apparatus may adapt a predefined coverage shape, e.g., by adjusting tilt angles, where example coverage shapes include a "macro" coverage shape, a "high-rise structure" coverage shape, and a "hotspot" coverage shape.

Of course, the present invention is not limited to the above features and advantages. Indeed, those skilled in the art will recognize additional features and advantages upon reading the following detailed description, and upon viewing the accompanying drawings.

DETAILED DESCRIPTION

Figures 1, 2:
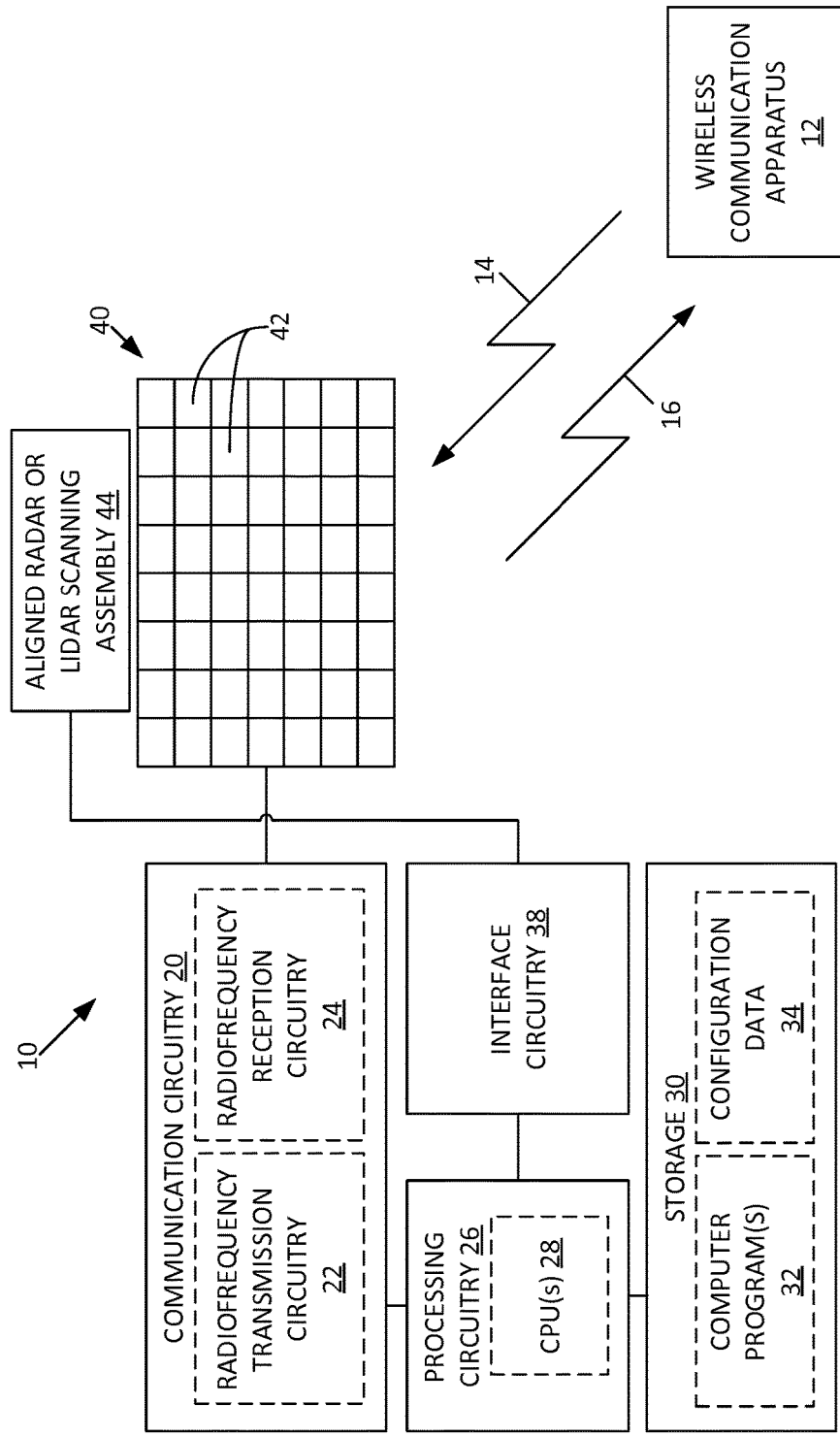
FIG. 1 is a block diagram of one embodiment of a wireless communication apparatus that includes or is associated with a directional antenna and includes or is associated with a RADAR or LIDAR assembly for scanning in beamforming directions associated with the directional antenna.
FIG. 2 is a block diagram of one embodiment of a wireless communication network that includes a Radio Access Network (RAN) radio node having the same or substantially the same configuration as the wireless communication apparatus introduced in FIG. 1.

One technique contemplated herein involves scanning the surroundings of a radio node or other wireless communication apparatus using RADAR or LIDAR and adapting operation of the apparatus in dependence on the scanning results. For example, the apparatus adapts its transmitter and/or receiver beamforming in dependence on whether or at what distances the RADAR/LIDAR scanning indicates the presence of obstacles along the Lines of Sight (LoS) for respective beamforming directions. The respective beamforming directions may be determined dynamically, e.g., based on dynamically-computed beamforming weights, or may be predefined, e.g., according to a predefined set of beams, each having preconfigured directionality and shape.

Additionally, or alternatively, the apparatus may adapt the communication signal frequencies it uses for given beam directions, e.g., avoiding or deprioritizing the use of communication signal frequencies above a defined frequency threshold in any beam direction that has been deemed as being "obstructed" based on the scanning results. As a further addition or alternative, the apparatus controls the transmission power it uses in respective beam directions, at least when operating at certain communication signal frequencies or in certain frequency ranges, in dependence on the scanning results. For example, it may reduce transmit power in beam directions associated with detected obstructions, and such operations may be understood as effectively shaping the radio coverage—in terms of coverage borders or range-of-coverage—in dependence on the detection of surrounding obstacles. In at least one such implementation, the apparatus adapts its radio coverage, e.g., its radio "cell" shape", for a transmitted carrier that is above a defined frequency threshold.

The apparatus in one example comprises a radio network node, such as a base station in a 5G network, which may be referred to as a "gNB". The beamforming configuration adaptations made as a function of RADAR or LIDAR scanning apply to at least one of uplink reception beamforming and downlink transmission beamforming at the gNB. In another example, the apparatus is User Equipment (UE) or other such wireless communication device operating in a 5G network. Here, the beamforming configuration adaptations made as a function of RADAR or LIDAR scanning apply to at least one of uplink transmission beamforming and downlink reception beamforming at the wireless communication device.

In a further example involving a wireless communication device adapted according to the RADAR/LIDAR scanning details presented herein—where "RADAR/LIDAR" denotes RADAR or LIDAR scanning or both RADAR and LIDAR scanning—the wireless device is idle or is performing inter-frequency measurements, and it needs to choose the "right" receive (Rx) beam to improve reception quality. Before it has received something from its supporting radio network node, e.g., a gNB in an NR RAN, the device uses a Grid of Beams (GoB) based approach to receive beamforming. With GOB, the device uses one beam from N different statically available beams. In more detail, the device uses RADAR/LIDAR to scan its surroundings, identifies obstacles/free spaces from the scanning results, and chooses the beam from the GOB that best suits its needs. Alternatively, the device adapts its GOB pattern to avoid generating beams in directions that the device, based on the scanning results, deems to be obstructed.

In a further example, a wireless communication device operates in a wireless communication network using a Frequency Division Duplexing (FDD) deployment for uplink and downlink communications. For making a Random Access (RA) attempt, e.g., a Random Access Channel (RACH) transmission, the device performs a RADAR or LIDAR scan of its surroundings, or at least with respect to some range of horizontal and azimuthal angles relative to its directional antenna, and it uses the scanning results to identify the most favorable beam directions to use for its RACH transmission. Alternatively, the device identifies beam directions to avoid, i.e., it identifies one or more obstructed directions and avoids making RACH transmissions in those directions. As a further alternative, the device prioritizes beam directions, such that it makes RACH preamble transmissions in one or more directions detected as unobstructed, before making any RA attempts in directions detected as obstructed.

In a further example, a wireless communication apparatus as contemplated herein may adapt its beam sweeping in dependence on the results obtained from RADAR/LIDAR scanning in relation to its directional antenna. Beam sweeping is an operation where the antenna beams are formed to cover a spatial area in a predetermined way. In one approach to beam sweeping, a narrow beam is directionally steered over or through a larger coverage area, effectively "sweeping" across the larger area. In another approach, the apparatus operates with a predefined set of beams, with each beam covering part of a larger coverage area. Beam sweeping in this arrangement comprises, for example, sequentially activating each beam during a corresponding portion of an overall beam sweeping period or cycle. The apparatus uses the RADAR/LIDAR scanning results to prioritize beams in the predefined set, e.g., by setting the sweep order or beam activation times to favor beams associated with unobstructed directions, or simply avoids using beams associated with obstructed directions, at least in cases where there are one or more beamforming directions detected as unobstructed and one or more beamforming directions detected as obstructed.

One or more embodiments contemplate the use of Doppler RADAR, for detecting the relative velocity of an object. In at least one such embodiment, the apparatus comprises a radio network node and it uses Doppler RADAR to identify which of its radio connections are associated with moving targets, e.g., a wirelessly-connected vehicle. For targets moving parallel to involved directional antenna(s), the frequency of beam-sweeping can be altered to match the speed of the target.

In other embodiments, such as when a radio network node or other access point is installed in a building, the node may use transmit beamforming to avoid transmitting in directions associated with detected obstructions. For example, at least for communication signal frequencies above a defined frequency threshold, the node may not transmit in directions associated with an immediately proximate wall, as detected via RADAR/LIDAR scanning More broadly, a transmission or reception site in a wireless communication network, e.g., a gNB in a 5G network using NR, may have one RADAR/

LIDAR scanning assembly or may have multiple such assemblies, depending, for example, on the directional antenna deployment(s). The RADAR/LIDAR assemblies may be adapted to the nature of the site, e.g., shorter range, lower power for indoor sites versus outdoor sites.

In at least some embodiments, the scan results from the RADAR/LIDAR assembly are provided to the associated wireless communication apparatus in terms of vertical and horizontal tilt, e.g., indications of the horizontal and vertical angles scanned and the distances to any objects detected in each scanned direction. For example, for the scan direction defined by a vertical angle of ten degrees and a horizontal angle of twenty degrees, the RADAR/LIDAR assembly may generate scan data that identifies the direction and indicates the distance to any detected obstructions.

The generation and content of the scan results may also depend on the level of integration between the wireless communication apparatus and the RADAR/LIDAR assembly. In one example, the apparatus triggers scanning but the RADAR/LIDAR assembly autonomously performs the scanning and reports the results. In other embodiments, e.g., such as where the RADAR/LIDAR assembly is a wholly controlled subassembly of the wireless communication apparatus, the apparatus may control the scanning itself, such as by controlling the scan directions, etc. The apparatus in one or more embodiments applies further processing or post-processing of the scan results, such as by evaluating whether multiple, contiguous or adjacent directions are associated with obstructions and correspondingly classifying the associated swath of coverage as being "urban", "wooded", or otherwise "obstructed". In turn, the apparatus may avoid or deprioritize any beam direction falling with the obstructed coverage area or may limit directional operations for the obstructed coverage area to frequencies with good obstacle penetration and robust multipath performance.

Depending on its design, its configuration, and, possibly, its installation particulars, a wireless communication apparatus performs RADAR/LIDAR scanning of its surrounds at programmed intervals, e.g., monthly, at power on, on a triggered basis, e.g., as commanded by an Operations & Maintenance (OAM) node in the network, or at other times. For example, if the apparatus is a UE or other wireless terminal, it may scan in advance of making any new connection to the network, as part of cell searching, etc.

The recalculation of beamforming parameters is most beneficial in situations when the wireless communication apparatus has little prior information on which direction(s) are most favorable for reception and/r transmission. For example, above a certain communication signal frequency threshold, the radio link between a receiver and a transmitter is limited to LoS. Thus, in one or more embodiments, the wireless communication apparatus calculates beamforming parameters differently for different frequency bands. For example, a first frequency band in the 600 MHz frequency range may be deemed insensitive to path obstructions and beamforming for reception or transmission in the first frequency band is not adapted as a function of RADAR/LIDAR scan results. However, a second frequency band in the 30 GHz range is deemed sensitive to path obstructions and beamforming for reception or transmission in the second frequency band is adapted as a function of RADAR/LIDAR scan results.

A full procedure for recalculating beamforming parameters may be triggered or repeated at a predefined interval, e.g., for a radio network base station, the network operator may configure the base station to scan or re-scan at defined intervals. Regardless, in an example embodiment, the complex beam weights used to create the directional reception beams and/or transmission beams are computed according to the formula $$w = \lfloor a_0, a_1 e^{-j\varsigma}, \ldots, a_{M-1} e^{-j(M-1)\varsigma} \rfloor, \text{ where}$$

$$\varsigma = \frac{2\pi f_0 d}{c} \sin(\theta_0),$$

and $f_c$ is the carrier frequency, d is the distance between the antenna elements, c is the speed of light and $\theta_0$ is the angle towards which the beam should point. Multiple beams can be generated by adding weights for different angles together. Input from the RADAR/LIDAR assembly about at which angles objects are detected is then used either to avoid those directions, or to prioritize the use of one or more beams corresponding to the unobstructed directions, or to adapt the signal frequencies used in the respective beam directions. Prioritizing the use of a beam or beams corresponding to unobstructed beam directions can be understood as de-prioritizing the use of beams corresponding to the obstructed directions.

Another embodiment contemplated herein uses the RADAR/LIDAR scan results for dynamic cell shaping in V2X deployments. Connectivity between vehicles and Network/Infrastructure (V2N/I) in V2X deployments relies on the use of Roadside Units (RSUs), which are stationary infrastructure entities that support V2X applications and can exchange messages with other entities supporting V2X applications. RSUs are envisioned to be deployed on the sides of highways and at traffic junctions, to support self-driving and so-called "connected" cars. For example, rather than using a traditional "macro" cell shape or omnidirectional transmissions, each RSU may shape its transmissions, including for synchronization signals, broadcast signals, and shared control signals, using detected-obstacle information gleaned from RADAR/LIDAR scanning.

Turning now to the various example illustrations, FIG. 1 depicts one embodiment of a wireless communication apparatus 10 that is configured for wireless communication with another wireless communication apparatus 12. The apparatuses 10 and 12 may be of the same type and may have the same configuration and capabilities, or they may be of different types and have differing capabilities. In one example, the apparatus 10 comprises a radio network node and the apparatus 12 comprises a UE, mobile terminal, or other wireless communication device operating in the wireless communication network that includes the apparatus 10. In the converse example, the apparatus 10 comprises a UE, mobile terminal, or other wireless communication device operating in a wireless communication network that includes the apparatus 12 as a base station or other such wireless access point.

In a general arrangement, the apparatus 12 transmits one or more signals 14 intended for reception at the apparatus 10, and the apparatus 10 transmits one or more signals 16 intended for reception at the apparatus 12. In an example where the apparatus 10 comprises a radio network node, the signals 16 are downlink signals and the signals 14 are uplink signals. In such embodiments, the apparatus 10 may be configured to communicate with a plurality of apparatuses 12.

According to the example details of FIG. 1, the apparatus 10 includes communication circuitry 20, such as radiofrequency transmission circuitry 22 and radio frequency reception circuitry 24. The example apparatus 10 further includes processing circuitry 26, e.g., one or more Central Processing Units (CPUs) 28, along with storage 30, e.g., storing one or more computer programs 32 for execution by the CPUs 28, and configuration data 34.

In an example embodiment, the configuration data 34 includes provisioned and/or dynamically-determined configuration information, such as information that predefines one or more sets of directional beams, such as by specifying default beam directions, beam shapes or sizes, beam sweep patterns, etc. The configuration data 34 may also contain information defining the beamforming configuration that is adaptively determined or modified according to the techniques disclosed herein. For example, for a given predefined set of beams corresponding to respective beamforming directions, the apparatus 10 identifies or otherwise classifies each beam direction as being "obstructed" or "unobstructed", or it may use a more finely graduated classification reflecting the degree or nature of obstruction and/or the distances to the detected obstructions. For example, obstructions closer than some threshold distance may be more pertinent to consider in beamforming than more distant obstructions. Indeed, in at least one embodiment, there is a cutoff distance beyond which detected obstructions are ignored.

In any case, the apparatus 10 then prioritizes the respective beam directions in dependence on the classifications, e.g., it favors the beam directions that are unobstructed or, in relative terms, "less obstructed", in comparison to the beam directions that are obstructed or, in relative terms, "more obstructed". Alternatively, or for at least some signal frequencies, the apparatus 10 may simply avoid using obstructed beam directions, or beam directions that have been characterized as having more than a threshold amount or degree of detected obstructions. Such a threshold may be expressed in terms of any one or more of obstacle size, the proliferation of obstacles along a beam direction, RADAR/LIDAR reflection characteristics, detected obstruction distances or proximity, etc.

In an example case, the apparatus 10 uses the scan results for each beam direction to determine a metric, e.g., a metric that represents the distance to the nearest detected obstacle, which could be qualified further in terms of minimum obstacle size. Of course, more than one metric could be used, e.g., obstacle size and distance information, number of detected obstacles, etc., or multiple detected values can be evaluated to determine an overall metric. The apparatus 10 in one or more implementations configures its beamforming, at least for certain communication frequencies or frequency bands, in dependence on the direction metrics. For example, it prioritizes the beam directions relative to one another, in dependence on the relative values of their associated metrics or adapts one or more beam parameters for a given direction in dependence on the metric determined for that direction.

The example apparatus 10 includes interface circuitry 38, e.g., discrete input/output signal connections, a network interface or data connection, etc., that provides communication and control between the apparatus 10 and an associated RADAR/LIDAR scanning assembly 44 that is "aligned" in terms of its scanning directions with a directional antenna 40 that is included in or associated with the apparatus 10. In an example embodiment, the directional antenna 40 includes a plurality of antenna elements 42. It shall be understood that the apparatus 10 may use the directional antenna 40 for transmit beamforming or for receive beamforming, or for both, or the apparatus 10 may have two or more directional antennas 40 for respective transmit and receive beamforming operations.

Among other points of variation, the interface circuitry 38 and the particulars of the RADAR/LIDAR scanning assembly 44 depend on the degree of integration between the apparatus 10 proper and the RADAR/LIDAR scanning assembly 44. In some embodiments, the assembly 44 is communicatively coupled to the apparatus 10 and may operate under its control, but it functions as a separate assembly that performs, e.g., scanning on a commanded basis, responsive to control signaling from the apparatus 10. In other embodiments, the assembly 44 is a wholly integrated sub-assembly of the apparatus 10, with concomitant configurations of the interface circuitry 38, power supplies (not shown), etc.

Regardless of such particulars, the RADAR/LIDAR assembly 44 shall be understood as comprising RADAR-based scanning equipment or LIDAR-based scanning equipment or both. Moreover, the assembly 44 is "aligned" with the directional antenna 40 in the sense that its scanning corresponds with or at least encompasses the range of beamforming angles (directions) used by or possible for the directional antenna 40. For example, there may be a specific set of horizontal and vertical angle values (value pairs), or defined ranges of horizontal and vertical angles, that correspond to the directions of respective beams in a predefined set of beams used by the apparatus 10 for reception beamforming and/or transmission beamforming from the directional antenna 40.

For perspective regarding selected ones of the foregoing example embodiments, FIG. 2 depicts a wireless communication network 50, including a Radio Access Network (RAN) 52 with one or more RAN radio nodes 54, and further including a Core Network (CN) 56. The network 50 provides communication services to wireless devices (WDs) 60, with only one wireless device 60 depicted, for simplicity. While not shown, the CN 56 communicatively couples to one or more external networks, such as the Internet or other packet data networks, the PSTN, etc., and thereby provides the wireless devices 60 with access to various communication services associated with the various external networks. By way of example, either one or both of the illustrated RAN radio node 54 and wireless device 60 may be implemented as a version of the wireless communication apparatus 10 introduced in FIG. 1 and described by way of example in the foregoing discussion.

Figure 3:
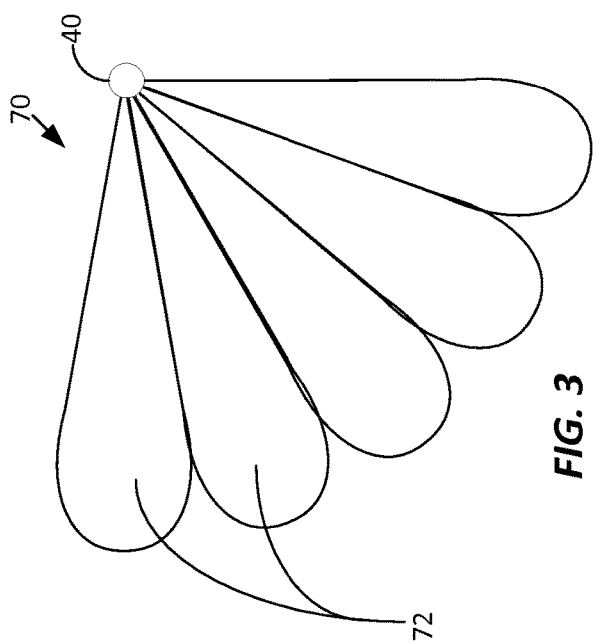
FIG. 3 is a diagram of an example predefined set of beams, for beamforming at a directional antenna.

FIG. 3 depicts an example set 70 of beams 72, where the set 70 may be predefined according to configuration information stored in the apparatus 10. The beams 72 shall be understood as representing directional antenna gains for reception and/or transmission at the directional antenna 40 of the apparatus 10. The depicted beam shapes, arrangement, and overlap represent an example case, rather than any limitation on the size, number, shape, and arrangement of beams 72 that can be configured according to the teachings herein.

Figure 4:
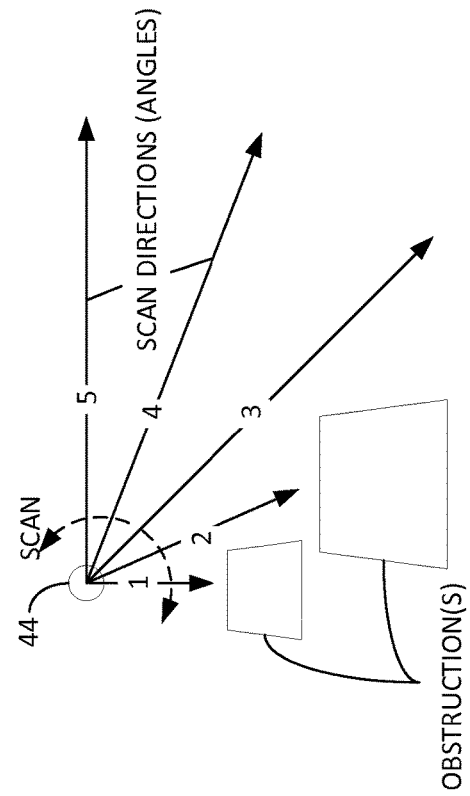
FIG. 4 is a diagram of scan directions associated with an example set of beamforming directions, for detecting obstacles lying along the Line of Sight (LoS) in the respective beamforming directions.

FIG. 4 depicts an example set of scan directions, which again may be defined in terms of angular values or ranges of angular values. One sees in the example illustration that the RADAR or LIDAR assembly 44—hereafter "scanning assembly 44"—scans in a number of directions, direction 1, direction 2, etc. The scanning directions correspond, for example, to respective directions used for the beams 72 in a predefined set 70 used by the apparatus for beamformed reception and/or transmission from the directional antenna 40.

The depicted scenario includes obstructions—buildings, geographic formations, woods, etc.—along scan directions 1 and 2. No obstructions appear along the scan directions 3, 4, and 5. Thus, the scan results provided by the scanning assembly 44 to the processing circuitry 26 of the apparatus 10 would indicate that obstacles were detected for directions 1 and 2 but not for directions 3, 4, and 5. The scan results may include more detailed information, such as the distances and/or sizes associated with the detected obstructions. Correspondingly, the apparatus 10 may decide not to use beams 72 that correspond to the obstructed directions or may decide to deprioritize the use of such beams 72 or may decide not to operate with certain communication signal frequencies with respect to the obstructed beam directions, or may decide, at least in a beamforming transmission scenario, to reduce beam powers in the obstructed directions. Of course, the apparatus 10 may use one or more combinations of the immediately preceding adaptations.

Thus, with the above example details in mind, a wireless communication apparatus 10 includes interface circuitry 38 that is configured to couple the processing circuitry 26 of the apparatus 10 to scanning assembly 44. Correspondingly, the processing circuitry 26 is configured to scan, via the scanning assembly 44, in directions corresponding to a predefined set 70 of beams 72 associated with a directional antenna 40 of the apparatus 10, and classify each direction as obstructed or unobstructed, based on results from the scan. Further, the processing circuitry 26 is configured to configure beamforming at the directional antenna 40 to prioritize the use of beams 72 in the predefined set 70 that correspond to unobstructed directions or avoid using beams 72 in the predefined set 70 that correspond to obstructed directions. The configuring of beamforming is done at least with respect to communication signal frequencies above a defined frequency threshold.

The processing circuitry 26 in one or more embodiments is configured to determine whether to operate with a first communication signal frequency or a second communication signal frequency with respect to a given beam 72 in the predefined set 70, in dependence on whether the corresponding direction is classified as obstructed or unobstructed. The first communication signal frequency is below the defined frequency threshold mentioned above, and the second communication signal frequency is at or above the defined frequency threshold.

In another embodiment or example case, the processing circuitry 26 is configured to configure the beamforming in an initialization process performed by the processing circuitry 26 in conjunction with the apparatus 10 attempting to communicate with or detect another wireless communication apparatus 12. For example, if the apparatus 10 is the RAN radio node 54 depicted in FIG. 2, the apparatus 10 may configure its receive beamforming for attempting to detect RA preambles from wireless devices 60. Conversely, if the apparatus is the wireless device 60 depicted in FIG. 2, the apparatus 10 may configure its transmit beamforming for RA preamble transmission, e.g., to avoid or disfavor RA preamble transmission in directions detected as being obstructed.

The processing circuitry 26 in one or more embodiments is configured to configure the beamforming on a triggered basis and operate the apparatus 10 with the configuration of beamforming determined at each performance until the next performance. For example, the processing circuitry 26 is configured to configure the beamforming in response to at least one of (a) receiving a command from another wireless communication apparatus 12 and (b) detecting that the apparatus 10 has changed location or orientation. Additionally, or alternatively, the processing circuitry 26 may perform new scans and make corresponding adjustments to the beamforming configuration, on a repeating basis, according to some programmed interval.

One approach for configuring beamforming is to use only those beams 72 in the predefined set 70 that correspond to unobstructed directions. Here, the processing circuitry 26 is configured to configure the beamforming at the directional antenna 40 of the apparatus 10 by configuring the beamforming to use only beams 72 in the predefined set 70 that correspond to unobstructed directions. Rather than completely avoiding beams 72 that correspond to directions deemed to be obstructed based on the results of the scanning performed by the scanning assembly 44, the processing circuitry 26 may be configured to configure the beamforming at the antenna 40 by prioritizing in terms of duration of beam activation or frequency of beam selection, beams 72 that correspond to unobstructed directions. An example prioritization scheme uses a longer beam activation time for beams 72 corresponding to unobstructed directions.

In an example where the apparatus 10 is implemented as a radio network node, such as the radio node 54 shown in FIG. 2, the processing circuitry 26 is configured to configure beamforming at the directional antenna 40 for transmitting to wireless devices 60, or receiving from wireless devices 60, or both receiving from and transmitting to wireless devices 60. In either or both contexts, the processing circuitry 26 may be configured to avoid using beams 72 that correspond to obstructed directions. Alternatively, the processing circuitry 26 may be configured to prioritize the beams 72 that correspond to unobstructed directions. Viewed from another perspective, the processing circuitry 26 may be configured to deprioritize or avoid the use of beams 72 corresponding to obstructed directions.

Prioritizing a given beam over another given beam means, for example, using the higher priority beam on a more frequent basis in comparison to the lower priority beam, or with higher power allocations, or for longer periods of time. Again, such operations may be performed with respect to downlink transmissions from the radio node 54 for wireless devices 60 and/or for uplink reception at the radio node 54 with respect to wireless devices 60.

Similarly, in an example where the apparatus 10 is implemented as a wireless device 60 in a communication network 50, the processing circuitry 26 is configured to configure beamforming at the directional antenna 40 for transmitting to one or more radio nodes 54 in the network 50, or receiving from one or more radio nodes 54, or both receiving from and transmitting to the radio node(s) 54. In either or both contexts, the processing circuitry 26 may be configured to avoid using beams 72 that correspond to obstructed directions. Alternatively, the processing circuitry 26 may be configured to prioritize the beams 72 that correspond to unobstructed directions. Viewed from another perspective, the processing circuitry 26 may be configured to deprioritize or avoid the use of beams 72 corresponding to obstructed directions.

Figure 5:
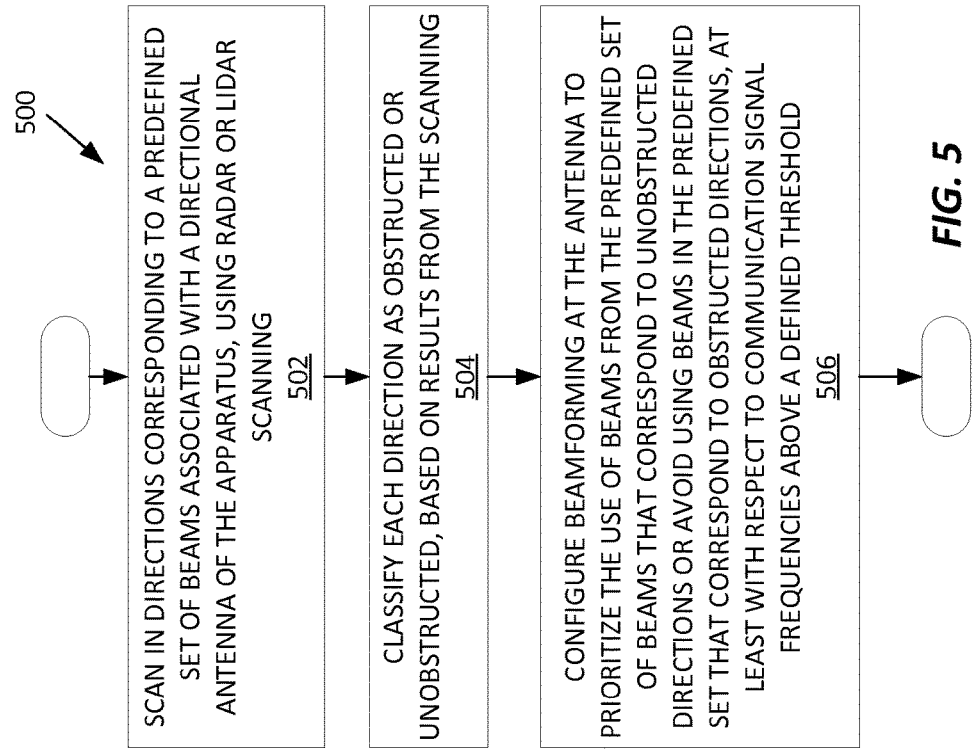
FIG. 5 is a logic flow diagram of one embodiment of a method of operation at a wireless communication apparatus, such as the wireless communication apparatus introduced in FIG. 1.

FIG. 5 illustrates a method 500 of operation at a wireless communication apparatus 10, such as the apparatus 10 depicted in FIG. 1. For example, the apparatus 10 the processing circuitry 26 of the apparatus 10 comprises one or more microprocessors, DSPs, or other digital processing circuits that are specially adapted to carry out the method 500, based on the execution of computer program instructions comprising the one or more computer programs 32 stored in the storage 30. Correspondingly, the storage 30 comprises, for example, a mix of volatile storage providing working memory during live processing by the processing circuitry 26 and non-volatile storage providing longer-term storage of program instructions, configuration data, etc. Non-limiting examples of the storage 30 include any one or more of Solid State Disk (SSD), EEPROM, FLASH, SRAM, DRAM, and Non-volatile (NV) RAM. More broadly, the processing circuitry 26 comprises fixed, dedicated circuitry, programmatically-configured circuitry, or some mix of fixed and programmed circuitry.

Understanding the method 500 in its example context requires appreciating that one or more of the illustrated processing operations may be performed in an order different than that suggested by the illustration. Additionally, or alternatively, one or more of the processing operations comprising the method 500 may be performed on a looped or repeating basis, e.g., according to some defined interval of repetition, or may be performed on a triggered basis, e.g., in response to receiving control signaling commanding performance or as part of power-on initialization or in response to detecting a change in location or orientation of the apparatus 10. Further, at least certain operations in the method 500 may be performed in conjunction with or as part of other, ongoing operations at the apparatus 10.

Operations in the example method 500 include the wireless communication apparatus 10 scanning (Block 502) in directions corresponding to a predefined set 70 of beams 72 associated with a directional antenna 40 of the apparatus 10, using RADAR or LIDAR scanning, where "RADAR or LIDAR" denotes one or the other or both. The method 500 further includes the apparatus 10 classifying (Block 504) each direction as obstructed or unobstructed, based on results from the scanning Angular resolutions used in RADAR or LIDAR scanning may match the angular resolution of the predefined set 70 of beams 72 or may be at a finer resolution, meaning that multiple RADAR or LIDAR beams may be used to scan the range of horizontal or vertical angles corresponding to a predefined reception or transmission beam in the predefined set 70.

Regardless, the RADAR or LIDAR scanning results enable the processing circuitry 26 of the apparatus 10 at least to classify a given beam direction as obstructed or unobstructed. In at least one embodiment, the classifying operation (Block 504) involves classifying a beam direction as obstructed if an obstruction is detected in that direction via the RADAR or LIDAR scanning. In other embodiments, the "obstructed" classification applies only if the detected obstruction(s) in the beam direction are closer than a threshold distance and/or meet certain threshold qualifications, e.g., in terms of size. For example, with sufficient angular resolution in the RADAR/LIDAR scanning, the scanning results allow the processing circuitry 26 to evaluate the RADAR or LIDAR profile of the detected obstructions and decide whether or to what extent the direction should be considered obstructed.

The method 500 further includes configuring (Block 506) the beamforming at the directional antenna 40 to prioritize the use of beams 72 in the predefined set 70 that correspond to unobstructed directions or avoid using beams 72 in the predefined set 70 that correspond to obstructed directions. The "configuring" of beamforming is done at least with respect to communication signal frequencies above a defined frequency threshold. That is, in some embodiments, the apparatus 10 uses the configured beamforming for all communication signal frequencies involved in the beamforming, which may be reception beamforming, transmission beamforming, or both reception and transmission beamforming.

In one or more other embodiments, however, the apparatus 10 uses the configured beamforming only for certain communication signal frequencies, e.g., those at or above 2 GHz, at or above 6 GHz, or at or above 30 GHz. To be sure, the apparatus 10 may use beamforming for all communication signal frequencies it operates at or with, but it may use the obstruction-based beamforming configuration of interest in this disclosure only for certain communication signal frequencies or ranges of frequencies. In an example scenario, the apparatus 10 operates with one or more "default" beamforming configurations, each of which may define a certain pattern of beams, e.g., in terms of beam size, shape, direction (coverage areas), the activation sequence for "beam sweeping", etc. These default beamforming configurations can then be understood as "baseline" configurations used by the apparatus 10 and the configuring operations (Block 506) in the method 500 can be understood as "adapting" or "modifying" one or more of the baseline beamforming configurations, in dependence on the classification of the respective beam directions in the baseline configuration(s) as being obstructed or unobstructed.

Other example implementations of the method 500 include the apparatus 10 determining whether to operate with a first communication signal frequency or a second communication signal frequency with respect to a given beam 72 in the predefined set 70, in dependence on whether the corresponding direction is classified as obstructed or unobstructed, the first communication signal frequency being below the defined frequency threshold and the second communication signal frequency being at or above the defined frequency threshold. As suggested immediately above, the apparatus 10 may be provisioned with more than one predefined set 70 of beams 72 and, in such cases, any reference to the "predefined set 70" shall be understood as a reference to whichever predefined set 70 is selected for use by the apparatus 10.

In one or more embodiments, the method 500 is performed as part of an initialization process performed by the apparatus 10 in conjunction with attempting to communicate with or detect another wireless communication apparatus 12. Additionally, or alternatively, the apparatus 10 performs the method 500 on a triggered basis and operates with the (obstruction-dependent) configuration of beamforming determined at each performance until the next performance. In at least one embodiment, performing the method 500 on a triggered basis comprises at least one of performing the method 500 responsive to receiving a command from another wireless communication apparatus 12, and responsive to detecting that the apparatus (10) has changed location or orientation.

Other example implementation details for the method 500 include performing the method 500 in the context of reception beamforming at the apparatus 10 or in the context of transmission beamforming at the apparatus 10, or in both contexts. In an example where the apparatus 10 is configured as a wireless communication device, e.g., the device 60 shown in FIG. 2, the method 500 may be performed to configure beamforming for random-access transmissions by the wireless device and/or may be performed to configure network-signal reception by the wireless device, e.g., when attempting to receive any one or more of network synchronization signals, control signals, reference signals, and broadcast signals from one or more radio nodes 54 in a wireless communication network 50.

In an example where the apparatus 10 is configured as a radio node 54 in the network 50, the method 500 may be used to configure reception beamforming at the radio node 54, e.g., for use in attempting to listen for (receive) RA preamble transmissions by wireless devices 60 operating in the coverage area of the radio node 54. Additionally, or alternatively, the radio node 54 performs the method 500 with respect to transmission beamforming, e.g., to identify the best directions for transmitting any one or more of network synchronization signals, reference signals, broadcast channel signals, common control channel signals, etc.

In any or all such cases, "configuring" the beamforming at the directional antenna in dependence on the beam direction classifications decided by the apparatus 10 in dependence on the RADAR/LIDAR scan results may comprise prioritizing beam directions classified as unobstructed or avoiding beam directions classified as obstructed. As a non-limiting example, a beam 72 in a predefined set 70 of beams 72 is prioritized by using it more often, e.g., more than once in each defined beam sweep or activation sequence, or by using it for a longer than "normal" duration in each beam sweep or activation sequence, or, in a transmission case, allocating a higher power to the beam 72. Conversely, prioritizing beams corresponding to unobstructed directions may entail using beams 72 corresponding to obstructed directions for a shorter than "normal" duration in each beam sweep or beam activation sequence or skipping use of such beams in one or more beam sweeps or beam activation sequences or, in a transmission case, allocating a lower power to such beams.

Thus, "configuring" the beamforming at the directional antenna 40 in view of the beam direction classifications decided from the RADAR/LIDAR scanning may involve beam prioritization, e.g., by favoring the beams 72 that correspond to the unobstructed directions or, equivalently, disfavoring the beams 72 that correspond to the obstructed directions, or completely avoiding the use of beams 72 corresponding to the obstructed directions. That is, in one or more embodiments, the configuring step 506 in the method 500 comprises using only the beams 72 in the predefined set 70 that correspond to beam directions classified as unobstructed. Of course, these example cases presuppose the existence of one or more unobstructed directions and it shall be understood that the operational logic embodied in the processing circuitry 26 of the apparatus 10 may accommodate the case where all beam directions are obstructed in any number of ways.

In one example, the processing circuitry 26 changes its definition of obstructed, e.g., by changing the threshold distance used for classifying beam directions as obstructed or unobstructed. Consider an initial or first scan which detects obstructions in all beam directions. Rather than classifying every direction as obstructed, the processing circuitry 26 may change the maximum obstruction distance, such that more distant obstructions are excluded from consideration. In another example, the processing circuitry 26 makes a more detailed assessment of the obstructions detected along the respective beam directions. For example, the processing circuitry 26 may determine, for each beam direction, whether the scan results indicate significant obstacle clutter, or very nearby obstructions, or obstructions beyond a certain size or spatial density, for purposes of making its unobstructed-versus-obstructed classification.

Figure 6:
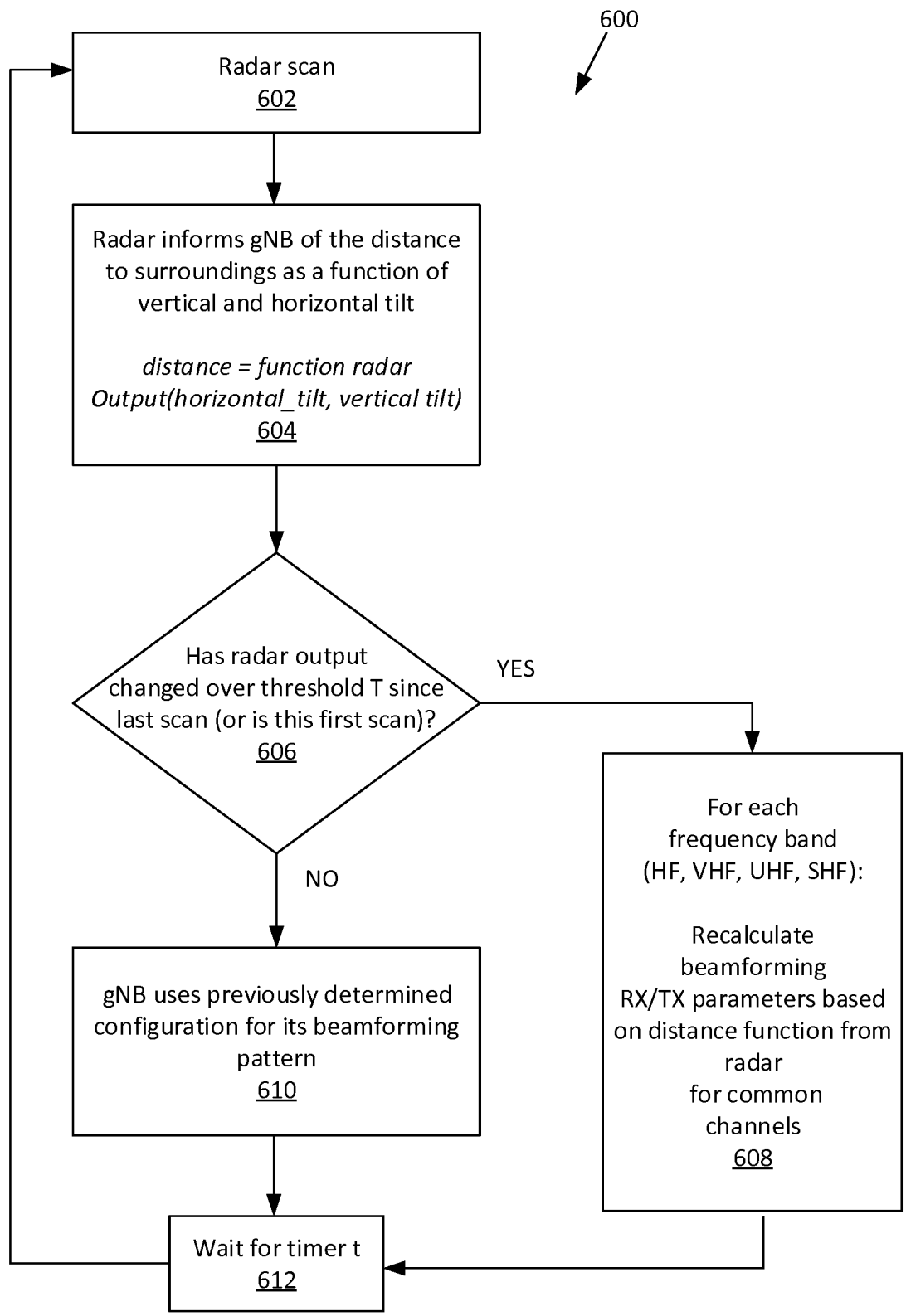
FIG. 6 is a logic flow diagram of another embodiment of a method of operation at a wireless communication apparatus, such as the wireless communication apparatus introduced in FIG. 1.

FIG. 6 illustrates another method 600 of operation by a wireless communication apparatus, such as the wireless communication apparatus 10 depicted in FIG. 1. In one or more example cases, the method 600 can be understood as a more detailed implementation or extension of the method 500 and the same qualifications regarding the order of execution and repetition noted for the method 500 apply with respect to the method 600. Further, the method 600 presupposes that the wireless communication apparatus 10 at issue is a "gNB", which is a base station in the 5G/NR context.

The method 600 includes performing a RADAR scan (Block 602), which may constitute the gNB triggering its included or associated RADAR/LIDAR assembly 44 to perform the scan. In Block 604, the assembly 44 informs (Block 604) the gNB of the distance to surrounding obstructions, expressed as a function of the horizontal and vertical tilts. The tilts may be expressed in angular values referenced to the orientation of the directional antenna 40, or the tilts used during scanning may be expressed in angular values referenced to the assembly 44 and translated into the frame of reference used for the directional antenna 40. Regardless, the orientation and alignment of the assembly 44 is such that its scan directions correspond with or otherwise encompass the beam directions at issue with respect to the directional antenna 40.

If the scan results reflect a substantive change in relation to the most recent prior scan results or if the scan is regarded as an initial or first scan (YES from Block 606), the gNB uses the scan results to configure its reception and/or transmission beamforming at the directional antenna 40 (Block 608). For example, it recalculates beamforming for reception (RX) or transmission (TX) or both, based on the obstruction distances detected for the involved beam directions, e.g., for each beam direction included in a predefined set 70 of beams 72. In a particular example, the determinations in Block 608 are performed with respect to beamforming used by the gNB for transmission of "common channels" from its directional antenna 40, and the obstruction-dependent configuration determinations made by the gNB for its beamforming may be done independently for each of one or more frequency bands and/or may be skipped for certain frequency bands that are insensitive or less sensitive to path obstructions.

If the RADAR scan results indicate no meaningful changes from the previous scan (NO from Block 606), the gNB uses its previously determined configuration for beamforming (Block 610). Here, the "previously determined" beamforming configuration may be a default beamforming configuration, such as would be used if the RADAR scanning did not indicate any obstructed beam directions or may be a modified or adapted version of a default beamforming configuration, as resulting from a previous execution of the operations depicted in Block 608. Processing then "continues" with Block 612, which can be understood as the gNB waiting for a defined duration before initiating another RADAR scan and correspondingly repeating, as needed, its configuration of beamforming at the directional antenna 40. The "timer" at issue in Block 612 thus defines the interval at which the gNB uses RADAR scanning to evaluate the surroundings of its directional antenna 40 and decide whether its beamforming configuration should be adapted in view of the most recent scan results.

Substantially the same operations as seen in the method 600 may be performed by a wireless device 60, except that the wireless device 60 would, as a general proposition, not be responsible for transmitting common channels in a network context. Instead, the wireless device 60 would apply the method 600 for determining RX and/or TX beamforming weights, e.g., when initially attempting to receive common-channel signals from a radio node 54 in a wireless communication network 50 and/or for RACH transmissions when attempting to connect to the network 50.

Figure 7:
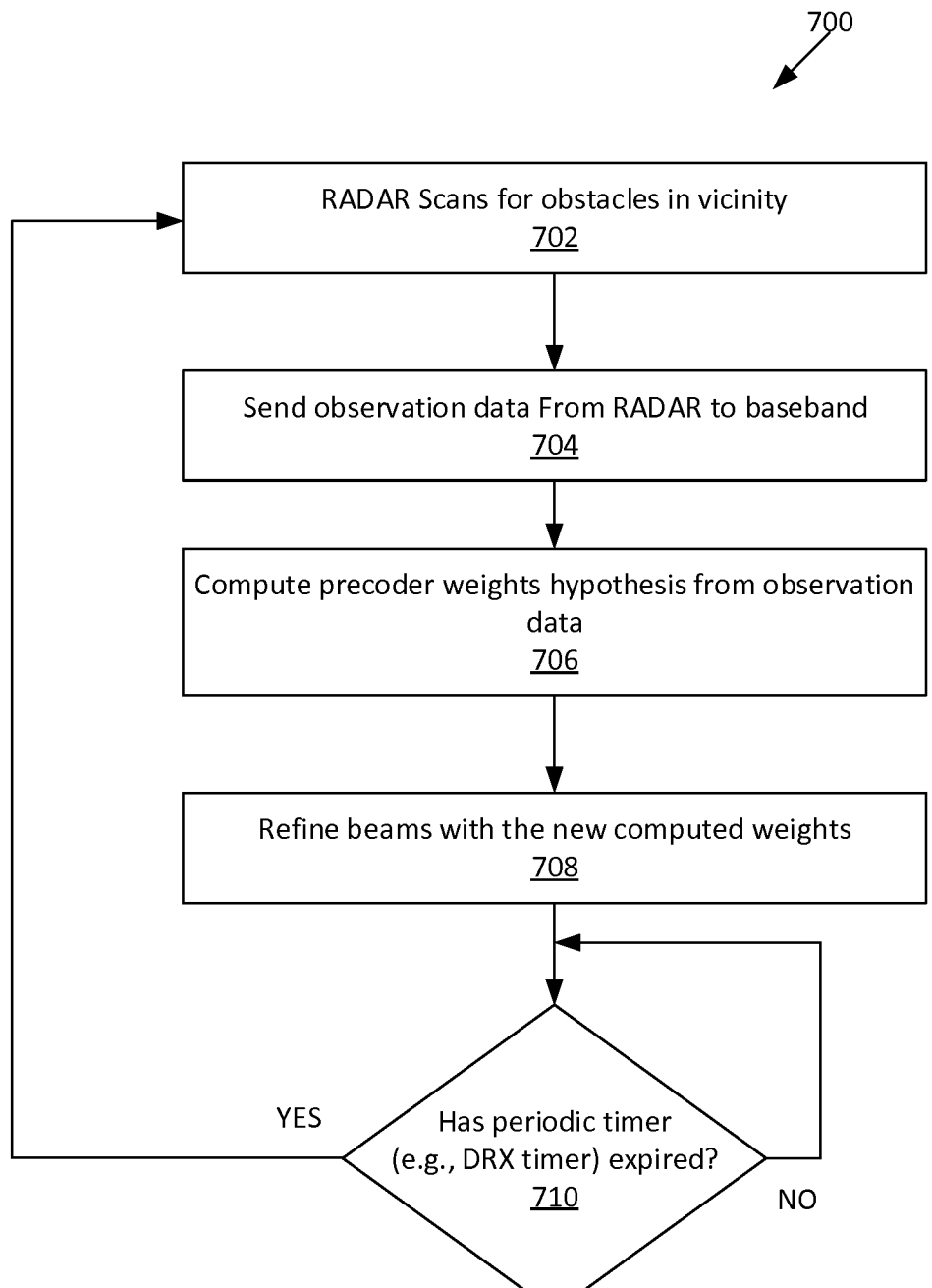
FIG. 7 is a logic flow diagram of another embodiment of a method of operation at a wireless communication apparatus, such as the wireless communication apparatus introduced in FIG. 1.

FIG. 7 illustrates yet another example method 700 that may be performed by a wireless communication apparatus 10, e.g., the processing circuitry 26 of the apparatus 10 depicted in FIG. 1 may be configured to perform the method 700. The method 700 has applicability to the operation of the apparatus 10 regardless of whether it is configured as a wireless communication device 60 or as a radio node 54 and, like the method 600, it may be regarded as a specific embodiment or extension of the method 500.

The illustrated method 700 includes the apparatus 10 using RADAR to scan for obstacles in the vicinity of its directional antenna 40 (Block 702). The method 700 further includes the observation data—scan results—from the RADAR scanning being transferred to baseband processing operations, e.g., as carried out by the processing circuitry 26 of the apparatus 10 (Block 704). The method 700 continues with the processing circuitry 26 computing a precoder weight hypothesis from the observation data (Block 706) and "refining" its beams with the newly computed weights (Block 708). Here, refining its beams can be understood as configuring beamforming with respect to the directional antenna 40, based on the newly computed precoder weights. As with the method 600, the method 700 includes a "waiting" provision (Block 710) that controls the interval at which the apparatus 10 repeats the RADAR scanning and corresponding adaptation of the beamforming configuration. In an example case where the apparatus 10 is a wireless communication device 60 that saves power by going into a lower activity state for a potentially extended period, e.g., discontinuous reception (DRX), the device 60 may perform the method 700 in conjunction with transitioning back to active reception and/or transmission operation.

Figure 8:
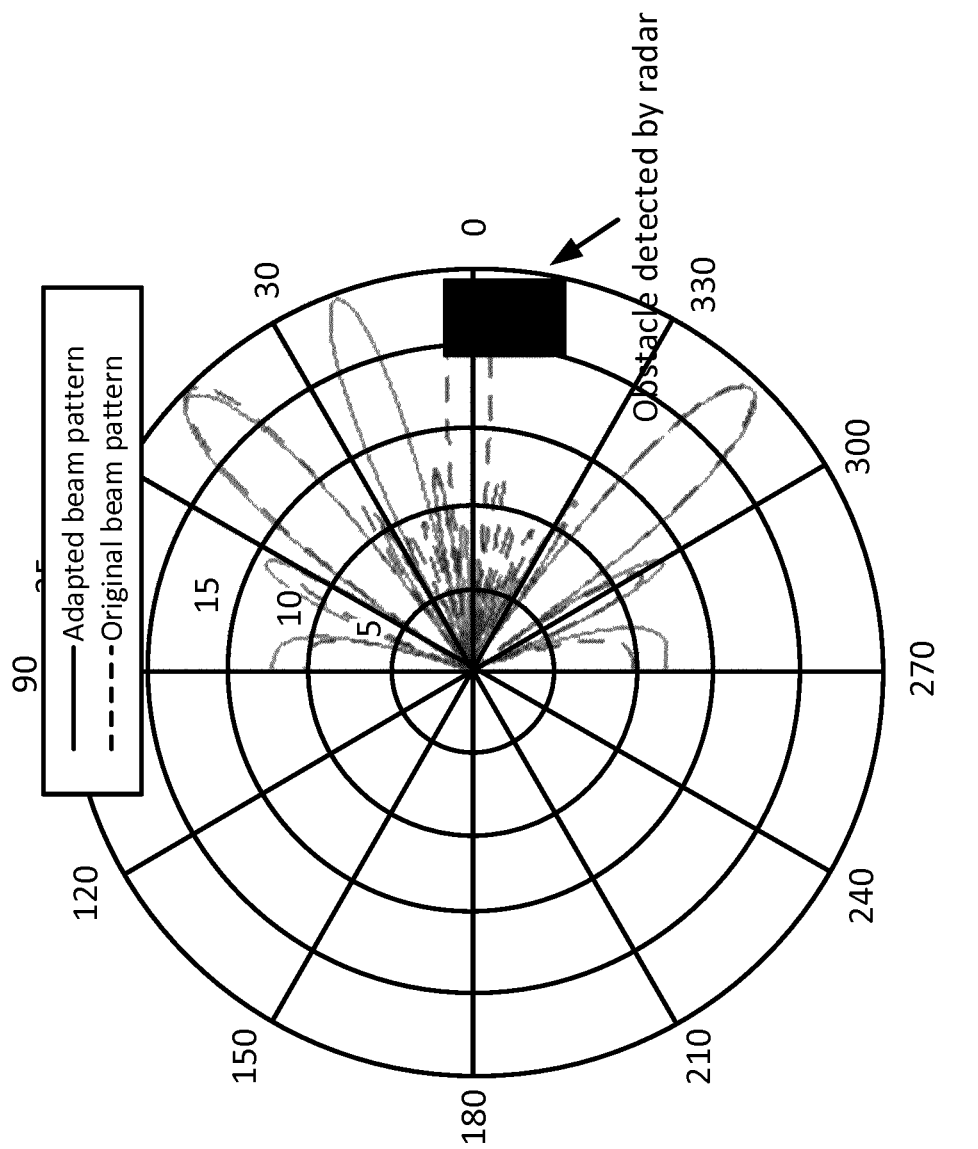
FIG. 8 is a diagram of an example case of adapting beam transmission power and, correspondingly, the shape of radio coverage provided via a directional antenna, in dependence on obstacles detected in respective beamforming directions via RADAR or LIDAR scanning.

FIG. 8 illustrates an original beam pattern and an adapted beam pattern. In an example case, the original beam pattern represents a default configuration for beamforming at the apparatus 10 or represents a previously determined configuration for beamforming at the apparatus 10. Correspondingly, the adapted beam pattern represents the configuration of beamforming determined based on RADAR/LIDAR scanning in relation to the directional antenna 40 of the apparatus 10. In particular, one sees that the adapted beam pattern foregoes the use of the beam in the original beam pattern having an obstructed direction—i.e., the obstacle detected at zero degrees of horizontal angle. As such, FIG. 8 stands as a non-limiting example of the processing circuitry 26 of the apparatus 10 being configured to avoid the use of beams 72 corresponding to obstructed beam directions. Of course, the adaptation of a default or previously determined beam configuration pattern may be more sophisticated than simply deciding on a different set of active beams 72. For example, the apparatus 10 may use more beams, fewer beams, different beam overlaps, different beam shapes or sizes, etc., in dependence on the most recent scan results.

Figure 9:
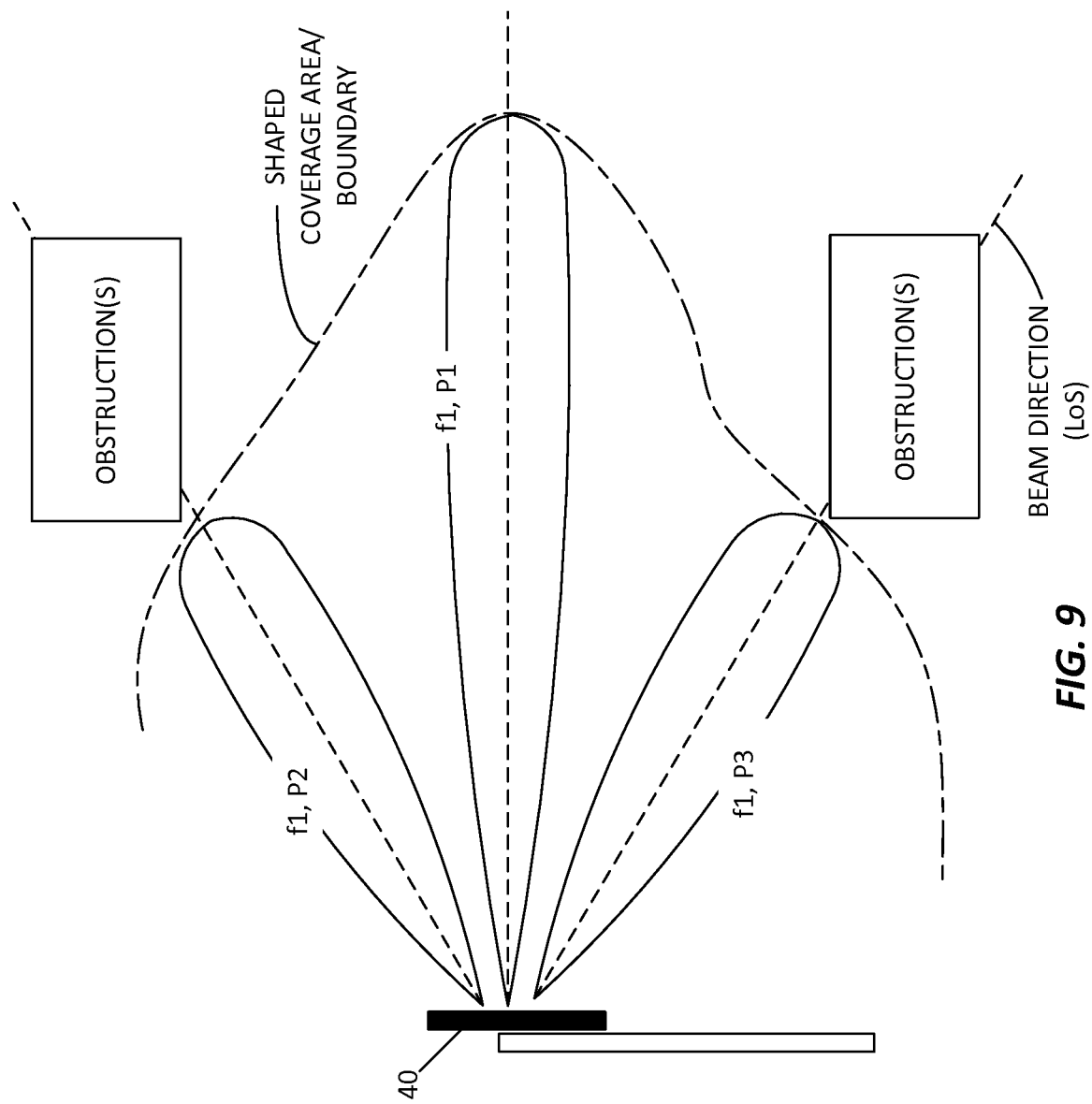
FIG. 9 is a diagram of another example case of adapting beam transmission power in dependence on the results of RADAR/LIDAR scanning in directions associated with an involved directional antenna.

FIG. 9 illustrates an example case where the processing circuitry 26 of the apparatus 10 is configured to configure beamforming at the directional antenna 40 by adapting or modifying the beamformed coverage area. In the illustrated scenario, the processing circuitry 26 extends the coverage area in unobstructed directions and pulls the coverage area boundary inward in obstructed directions. FIG. 9 illustrates an example beamforming configuration that involves three transmit beams all at the same communication signal frequency (f1) but each having a transmission power set independence on the RADAR/LIDAR scan results for the corresponding beam directions. Here, the beamforming direction may be taken as the horizontal and or angular value corresponding to a line of sight (LoS).

Figure 10:
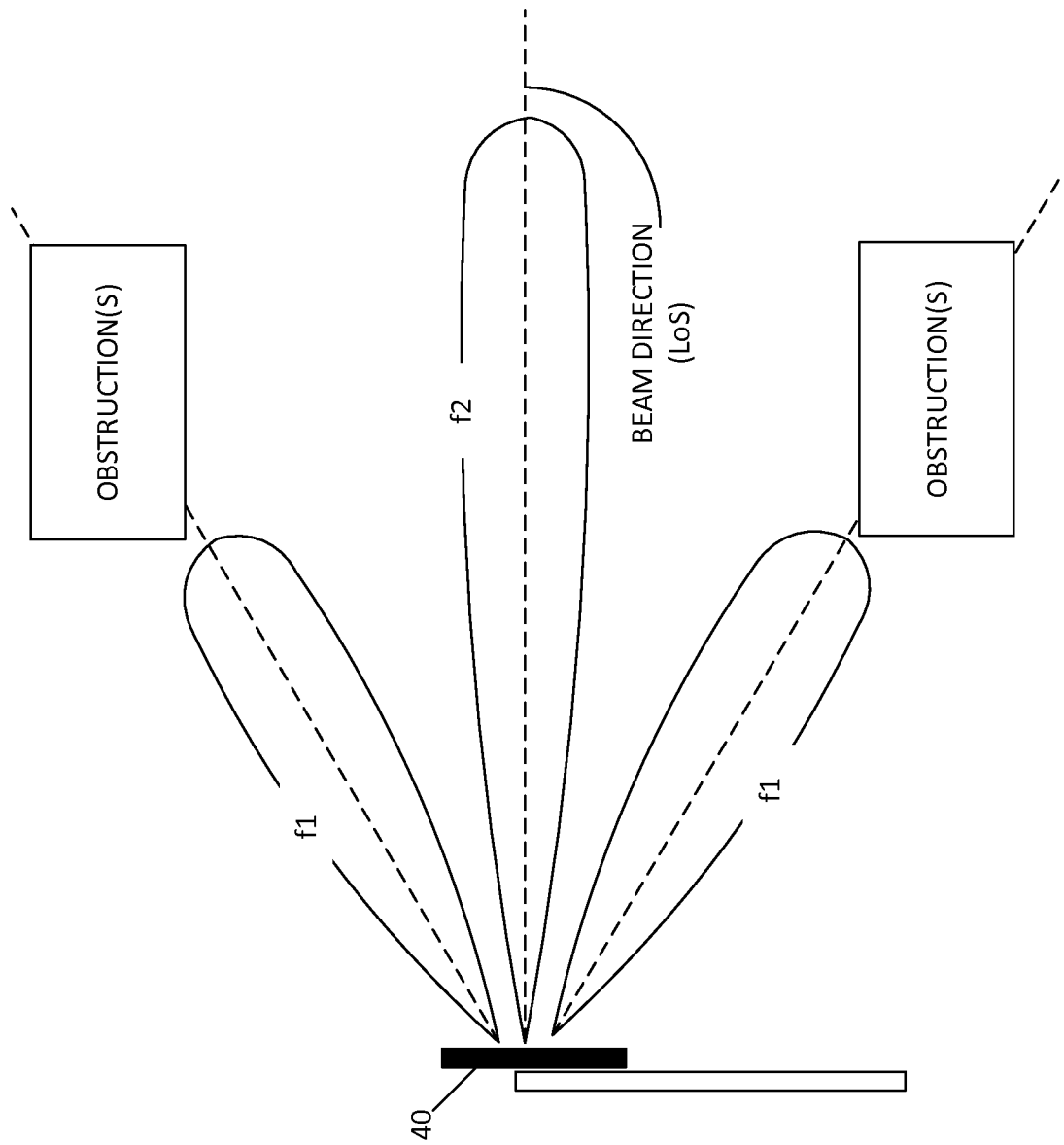
FIG. 10 is a diagram of an example case of adapting the communication signal frequencies or coverage in different beamforming directions, in dependence on the results of RADAR/LIDAR scanning.

Whereas FIG. 9 illustrated the adaptation of the coverage shape or boundary, e.g. the adaptation of the "cell" shape, FIG. 10 illustrates an alternative embodiment where the processing circuitry 26 of the apparatus 10 decides which communication signal frequencies or frequency bands to use in respective beam directions based on the RADAR/LIDAR scan results. For example, in the context of FIG. 10, "f1" denotes a first communication signal frequency or frequency band and "f2" denotes a second communication signal frequency or frequency band that is lower than the first communication signal frequency or frequency band. The second communication signal frequency or frequency band may be below a defined frequency threshold and the first communication signal frequency or frequency band may be above the defined frequency threshold. In an example case where the apparatus 10 comprises a radio node 54 in a wireless communication network 50, the radio node 54 may provide communication service coverage using a lower communication signal frequency or frequency band in directions that are considered as being obstructed and may restrict its use of higher communication signal frequencies or frequency bands to those beam directions that are considered as being unobstructed.

Figure 11:
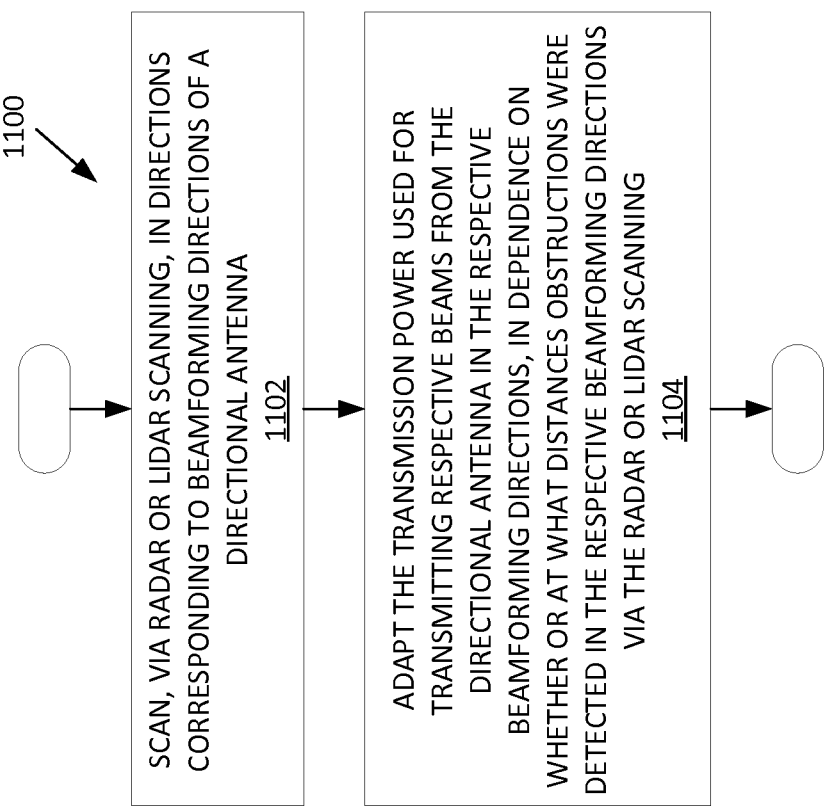
FIG. 11 is a logic flow diagram of another embodiment of a method of operation at a wireless communication apparatus, such as the wireless communication apparatus introduced in FIG. 1.

FIG. 11 illustrates a method 1100 in keeping with the operational configurations described immediately above. In the method 1100, the apparatus 10 scans in directions corresponding to beamforming directions of its directional antenna 40, using RADAR/LIDAR scanning (Block 1102). The method 1100 further includes the apparatus 10 adapting the transmission power used for transmitting respective beams from the directional antenna 40, in dependence on whether or at what distances obstructions were detected in the respective beamforming directions via the RADAR/LIDAR scanning (Block 1104).

Figure 12:
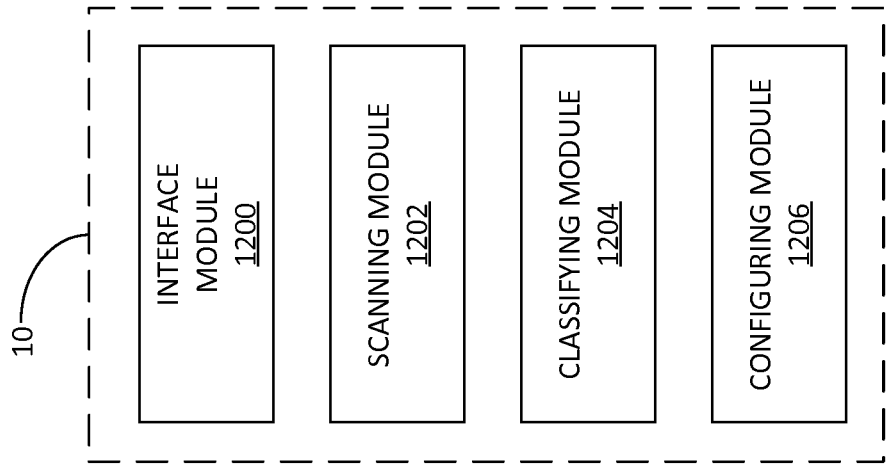
FIG. 12 is a block diagram of another embodiment of a wireless communication apparatus.

FIG. 12 illustrates another example implementation of a wireless communication apparatus 10 as contemplated herein. In the illustrated example, a wireless communication apparatus 10 comprises a number of modules or units that represent functional processing elements within the apparatus 10, such as may be realized via the execution of computer program instructions by one or more digital processors comprising the processing circuitry 26 of the apparatus 10.

Here, the apparatus 10 comprises an interface module 1200 that is configured for interfacing the apparatus 10 with the included or associated RADAR/LIDAR scanning assembly 44. The interface module 1200, for example, coordinates control and data signaling going between the processing circuitry 26 and the assembly 44. A further included scanning module 1202 is configured to perform the scanning via the assembly 44 or is otherwise configured to receive and process the scanning results, to determine obstruction information relative to the involved beam directions. A classifying module 1204 is configured to classify respective beam directions as being obstructed or unobstructed based on the output from the scanning module 1202, and a configuring module 1206 is configured to configure the beamforming used for transmission and/or reception via the directional antenna 40, independence on the classifications decided by the classifying module 1204. As detailed elsewhere in the disclosure, "configuring" the beamforming configuration comprises, for example, determining the set or sets of beamforming weights that dictate the shape, size, and polarization of the beams, the number of beams, and the orientations or directions of the beams.

Broadly, the apparatus 10 in one or more embodiments may "configure" beamforming at its directional antenna 40 using any one or more approaches, such as any one or more of beam steering, rearranging beams, adding or subtracting beams, reshaping beams, etc. For example, it may dynamically generate or update precoder weights that define the beam pattern used at the antenna 40, in dependence on RADAR/LIDAR scan results. In other embodiments or at other times, the apparatus 10 may adapt a predefined set 70 of beams 72, such as by prioritizing usage of beams 72 in the set 70 that correspond to unobstructed directions or by skipping any use of beams 72 in the set that correspond to obstructed directions, with such operations being done at least for certain communication signal frequencies or frequency ranges.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a wireless communication apparatus, the method comprising:
    scanning in directions corresponding to a predefined set of beams associated with a directional antenna of the apparatus, using RADAR or LIDAR scanning, wherein scan results from the scanning comprise indications of distances to obstacles detected in the respective directions;
    classifying each direction as obstructed or unobstructed, the classification considering distances of detected obstacles, as determined from the scan results for each direction; and
    configuring beamforming at the directional antenna to prioritize the use of beams in the predefined set that correspond to unobstructed directions or avoid using beams in the predefined set that correspond to obstructed directions, said configuring done at least with respect to communication signal frequencies above a defined frequency threshold.

2. The method of claim 1, further comprising allocating lower transmit power to beams in the predefined set that correspond to obstructed directions than allocated to beams in the predefined set that correspond to unobstructed directions, thus shaping the radio coverage in dependence on detection of surrounding obstacles.

3. The method of claim 1, wherein, for each direction for which one or more obstacles were detected, classifying the direction as unobstructed or obstructed depends on one or more of the following:
    a size of the detected one or more obstacles;
    a proliferation of the detected one or more obstacles along the direction;
    RADAR or LIDAR reflection characteristics;
    a detected distance to the detected one or more obstacles.

4. The method of claim 1, further comprising determining whether to operate with a first communication signal frequency or a second communication signal frequency with respect to a given beam in the predefined set, in dependence on whether the corresponding direction is classified as obstructed or unobstructed, the first communication signal frequency being below the defined frequency threshold and the second communication signal frequency being at or above the defined frequency threshold.

5. The method of claim 1, further comprising performing the method as part of an initialization process performed by the apparatus in conjunction with attempting to communicate with or detect another wireless communication apparatus.

6. The method of claim 1, wherein the apparatus comprises a radio network node configured for operation in a wireless communication network, and wherein, for transmitting at least one of system configuration information, reference signals, and synchronization signals, configuring the beamforming at the directional antenna comprises avoiding or deprioritizing the use of any beams in the predefined set that correspond to obstructed directions.

7. A wireless communication apparatus comprising:
    interface circuitry configured to couple processing circuitry of the wireless communication apparatus to a RADAR or LIDAR assembly; and
    said processing circuitry configured to:
        scan, via the RADAR or LIDAR assembly, in directions corresponding to a predefined set of beams associated with a directional antenna of the apparatus, wherein results from the scan comprises indications of distances to obstacles detected in the respective directions;
        classify each direction as obstructed or unobstructed, considering distances of detected obstacles, as determined from the scan results for each direction; and
        configure beamforming at the directional antenna to prioritize the use of beams in the predefined set that correspond to unobstructed directions or avoid using beams in the predefined set that correspond to obstructed directions, said configuring done at least with respect to communication signal frequencies above a defined frequency threshold.

8. The apparatus of claim 7, wherein the processing circuitry is configured to allocate lower transmit power to beams in the predefined set that correspond to obstructed directions than allocated to beams in the predefined set that correspond to unobstructed directions, thus shaping the radio coverage in dependence on detection of surrounding obstacles.

9. The apparatus of claim 7, wherein, for each direction for which one or more obstacles were detected, the processing circuitry is configured to classify the direction as unobstructed or obstructed in dependence on one or more of the following:
    a size of the detected one or more obstacles;
    a proliferation of the detected one or more obstacles along the direction;
    RADAR or LIDAR reflection characteristics;
    a detected distance to the detected one or more obstacles.

10. The apparatus of claim 7, wherein the processing circuitry is configured to determine whether to operate with a first communication signal frequency or a second communication signal frequency with respect to a given beam in the predefined set, in dependence on whether the corresponding direction is classified as obstructed or unobstructed, the first communication signal frequency being below the defined frequency threshold and the second communication signal frequency being at or above the defined frequency threshold.

11. The apparatus of claim 7, wherein the processing circuitry is configured to configure the beamforming in an initialization process performed by the processing circuitry in conjunction with the apparatus attempting to communicate with or detect another wireless communication apparatus.

12. The apparatus of claim 7, wherein the processing circuitry is configured to configure the beamforming on a triggered basis and operate the apparatus with the configuration of beamforming determined at each performance until the next performance.

13. The apparatus of claim 7, wherein, as said triggered basis, the processing circuitry is configured to configure the beamforming in response to at least one of: receiving a command from another wireless communication apparatus and detecting that the apparatus has changed location or orientation.

14. The apparatus of claim 7, wherein the processing circuitry is configured to configure the beamforming at the directional antenna by configuring the beamforming to use only beams in the predefined set that correspond to unobstructed directions.

15. The apparatus of claim 7, wherein the processing circuitry is configured to configure the beamforming at the directional antenna by configuring beam sweeping at the directional antenna to prioritize, in terms of duration of beam activation or frequency of beam selection, beams in the predefined set that correspond to unobstructed directions.

16. The apparatus of claim 7, wherein, for attempting to receive communication signals from one or more other wireless communication apparatuses, the processing circuitry is configured to configure the beamforming at the directional antenna by prioritizing the use of beams in the predefined set that correspond to unobstructed directions or avoiding the use of beams in the predefined set that correspond to obstructed directions.

17. The apparatus of claim 7, wherein the apparatus comprises a radio network node configured for operation in a wireless communication network, and wherein, for transmitting at least one of system configuration information, reference signals, and synchronization signals, the processing circuitry is configured to configure the beamforming at the directional antenna to avoid or deprioritize the use of any beams in the predefined set that correspond to obstructed directions.

18. The apparatus of claim 7, wherein the apparatus comprises a radio network node configured for operation in a wireless communication network, and wherein, for receiving or attempting to receive communication signals from one or more wireless devices operating in the wireless communication network, the processing circuitry is configured to configure the beamforming at the directional antenna to avoid or deprioritize the use of any beams in the predefined set corresponding to obstructed directions.

19. The apparatus of claim 7, wherein the apparatus comprises a wireless device configured for operation in a wireless communication network, and wherein, for transmitting one or more signals targeting the wireless communication network, the processing circuitry is configured to configure the beamforming at the directional antenna to prioritize or only use one or more beams in the predefined set that correspond to unobstructed directions.

20. The apparatus of claim 7, wherein the apparatus comprises a wireless device configured for operation in a wireless communication network, and wherein, for receiving or attempting to receive communication signals from the wireless communication network, the processing circuitry is configured to configure beamforming at the directional antenna to prioritize or only use one or more beams in the predefined set that correspond to unobstructed directions.

* * * * *